(12) United States Patent
Ford et al.

(10) Patent No.: US 6,395,981 B1
(45) Date of Patent: May 28, 2002

(54) MULTIPLE GANG JUNCTION BOX ASSEMBLY WITH ELECTRICAL ARCING ISOLATION BETWEEN COMPARTMENTS

(75) Inventors: Gregory H. Ford, Reno; Oliver H. Lieder, Carson City, both of NV (US)

(73) Assignee: OEM Systems Company, Inc., Sparks, NV (US)

( * ) Notice: Subject to any disclaimer, the term of this patent is extended or adjusted under 35 U.S.C. 154(b) by 0 days.

(21) Appl. No.: 09/824,118

(22) Filed: Apr. 2, 2001

(51) Int. Cl.$^7$ ................................................ H02G 3/08
(52) U.S. Cl. ............................ 174/50; 174/53; 174/48; 220/3.2; 220/3.3
(58) Field of Search ..................... 174/50, 53, 17 R, 174/59, 57, 58, 48, 66, 67; 220/3.2, 3.3, 3.5, 3.6, 3.7, 3.8, 3.94, 4.01, 4.02, 4.33, 241, 3.92, 476, 533

(56) References Cited

U.S. PATENT DOCUMENTS

| | | | |
|---|---|---|---|
| 1,929,844 A | 10/1933 | Haas ........................... | 247/16 |
| 3,472,945 A | 10/1969 | Trachtenberg ............... | 174/53 |
| 3,587,906 A | 6/1971 | Pepe ........................... | 220/3.2 |
| 3,905,484 A | 9/1975 | Dean et al. ................. | 211/184 |
| 4,455,449 A | 6/1984 | Rendel ......................... | 174/53 |
| 5,177,325 A | 1/1993 | Giammanco ................. | 174/50 |
| 5,486,650 A | 1/1996 | Yetter .......................... | 174/53 |
| 5,594,207 A | 1/1997 | Fabian et al. ................ | 174/58 |
| 5,990,439 A | 11/1999 | Pever .......................... | 218/156 |
| 6,091,023 A | 7/2000 | O'Donnell .................... | 174/57 |

Primary Examiner—Dean A. Reichard
Assistant Examiner—Angel R. Estrada
(74) Attorney, Agent, or Firm—Flanagan & Flanagan; John R. Flanagan

(57) ABSTRACT

A multiple gang junction box assembly includes a main box, divider panels, positioning elements attached to the main box in an interior chamber thereof for slidably receiving the divider panels therein and laterally spacing apart the divider panels from one another so as to partition the interior chamber into adjacent compartments being in a condition of electrical arcing isolation from one another which allows low and high voltage components to be housed therein, and a front cover plate having vertical lands protruding therefrom and laterally spaced apart from one another. The displacement of the divider panels from one another is equal to a selected number of times the distance of the vertical lands from one another. At least some vertical lands of the front cover plate and the front edge portions of the divider panels are placed in flush contact providing additional isolation of adjacent compartments from one another.

19 Claims, 4 Drawing Sheets

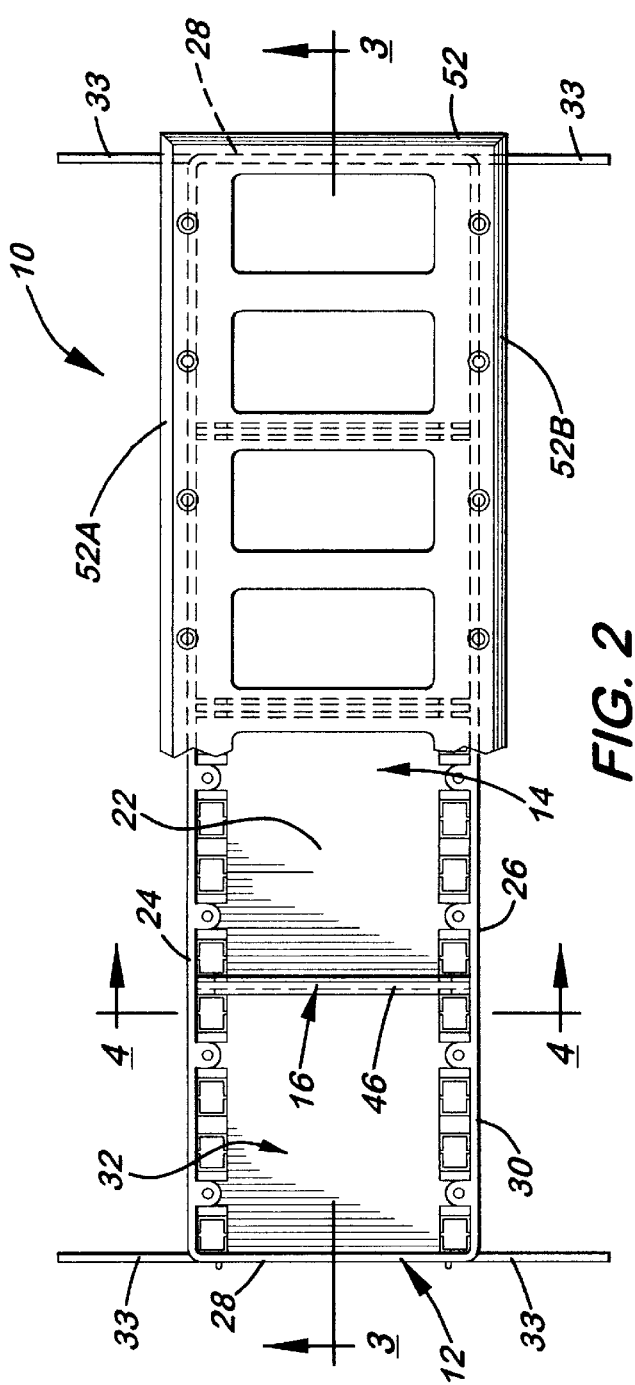
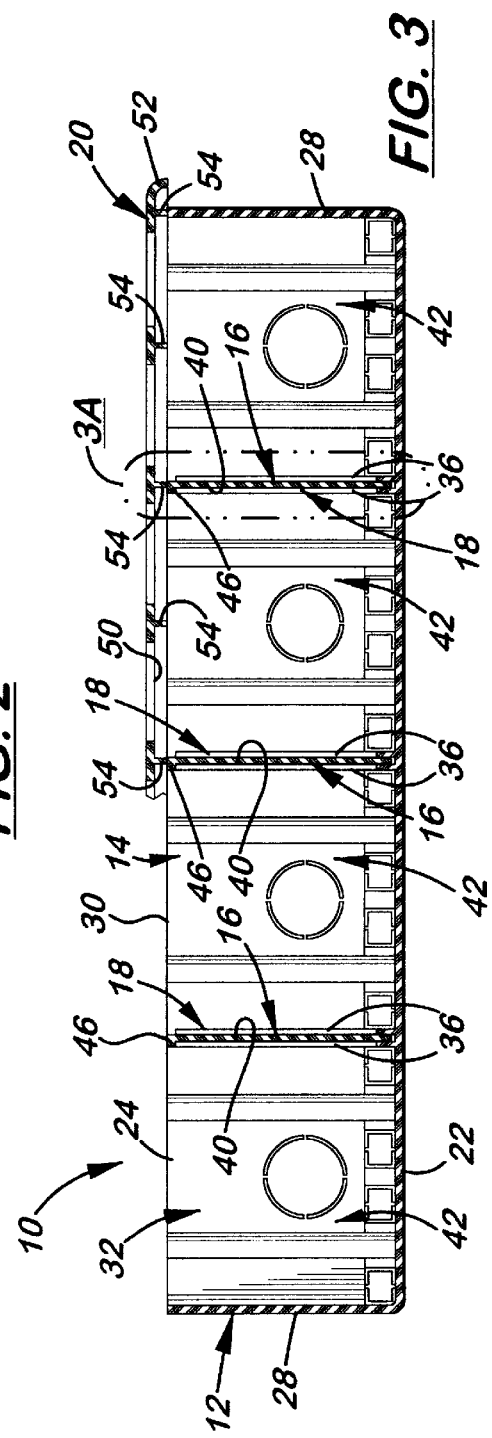

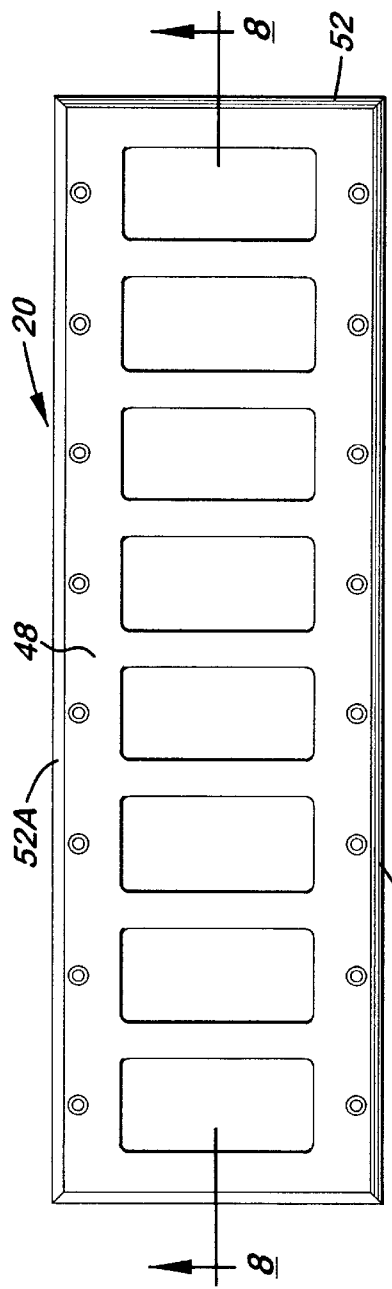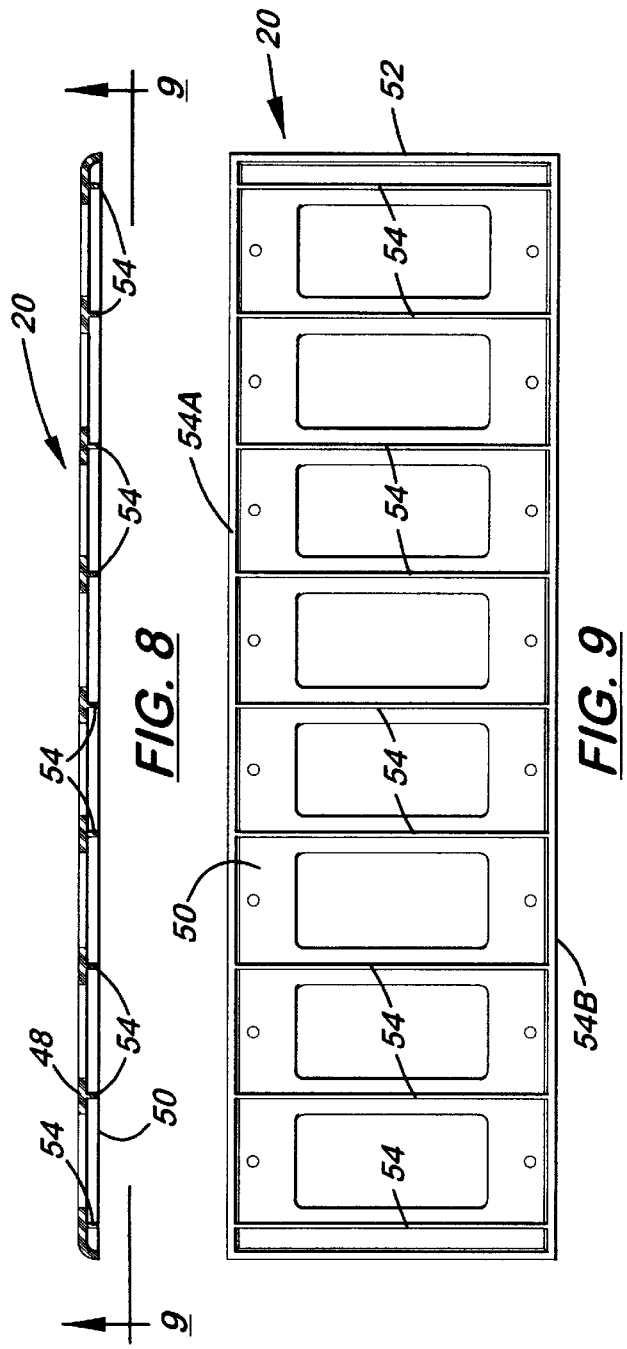

MULTIPLE GANG JUNCTION BOX ASSEMBLY WITH ELECTRICAL ARCING ISOLATION BETWEEN COMPARTMENTS

BACKGROUND OF THE INVENTION

1. Field of the Invention

The present invention generally relates to multiple gang junction boxes and, more particularly, is concerned with a multiple gang junction box assembly with electrical arcing isolation between side-by-side compartments of the assembly.

2. Description of the Prior Art

Multiple gang junction boxes have long been well-known that generally include a front cover and a rectangular or any other desired shaped box having a rear wall and side walls at the top, bottom and opposite ends of the box which extend forwardly from the rear wall to form an open front which can be closed by the front cover. The rear wall and/or side walls are typically provided with preformed knockouts the removal of which provide openings in the box walls through which electrical wires can pass for connection to devices mounted in the box.

As is well known in the electrical field, Underwriter's Laboratory (UL) code requires that multiple gang junction boxes shall have therein suitable partitions dividing the box into separate compartments which will provide electrical arcing isolation therebetween where the box is to be utilized to house electric devices involving high and low voltage levels. Examples of prior art multiple gang junction boxes having partitioned compartments are the ones disclosed in U.S. Pat. No. 1,929,844 to Haas, U.S. Pat. No. 3,472,945 to Trachtenberg, U.S. Pat. No. 3,587,906 to Pepe, U.S. Pat. No. 4,455,449 to Rendel and U.S. Pat. No. 5,594,207 to Fabian et al.

Previous attempts to provide multiple gang junction boxes with suitable features that will satisfactorily divide the box into separate compartments so as to provide electrical arcing isolation between the compartments and thus meet the UL code requirements and still be economical and easy to manufacture have not been altogether successful. As a consequence, a need still remains for an innovation which will meet the electrical arcing isolation requirements and still be economical to manufacture.

SUMMARY OF THE INVENTION

The present invention provides a multiple gang junction box assembly designed to satisfy the aforementioned needs. The box assembly has a main box, a plurality of divider panels and a front cover plate which cooperate together to divide and separate an interior chamber of the main box into side-by-side compartments having enhanced electrical arcing isolation of the side-by-side compartments from one another.

Accordingly, the present invention is directed to a multiple gang junction box assembly which comprises: (a) a main box having an interior chamber and a front peripheral edge defining a front opening to the interior chamber; (b) a plurality of divider panels separable from the main box, each of the divider panels having a front edge portion thereon; (c) a plurality of positioning elements attached to the main box in the interior chamber thereof and slidably receiving and positioning the divider panels in the interior chamber so as to laterally space apart the divider panels from one another through a given displacement and to partition the interior chamber into a plurality of side-by-side compartments provided in a condition of electrical arcing isolation from one another which allows low and high electrical voltage components to be housed in the side-by-side compartments; and (d) a front cover plate separate from the main box and the divider panels, the front cover plate having opposite front and rear sides, a peripheral edge and a plurality of vertical lands formed on and protruding from the rear side of the front cover plate and laterally spaced apart from one another by a given distance, the given displacement of the divider panels from one another in the interior chamber being substantially equal to a predetermined number of times the given distance of the vertical lands from one another, the vertical lands also extending between top and bottom portions of the peripheral edge of the front cover plate such that with the front cover plate positioned adjacent to the front peripheral edge of the main box and covering the front opening thereof at least some of the vertical lands of the front cover plate and the front edge portions of the divider panels are placed in flush contact with one another so as to close off adjacent ones of the side-by-side compartments from one another at the front edge portions of the divider panels and thereby provide additional isolation of the side-by-side compartments from one another.

More particularly, the main box, divider panels and front cover plate are made of plastic material. The positioning elements are a plurality of laterally spaced apart sets of pairs of spaced apart ledges attached on and extending along the interiors of top, bottom and rear walls of the main box and extending into the interior chamber. The pairs of spaced apart ledges of each set are aligned with one another and define a channel therebetween. Each of the divider panels is insertable into the channel defined by the pairs of spaced apart ledges of one of the sets thereof. The front edge portion of each of the divider panels is a front flange having a width greater than a width of the one of the vertical lands of the front cover plate such that the land can be misaligned with the divider panel and still be in flush contact with the front flange on the divider panel.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is a front elevational view of the assembly of FIG. 1 with all the divider panels installed in the main box.

FIG. 3 is a longitudinal sectional view of the assembly taken along line 3—3 of FIG. 2.

FIG. 7 is a front elevational view of the front cover plate of the assembly of FIG. 1.

FIG. 8 is a longitudinal sectional view of the front cover plate taken along line 8—8 of FIG. 7.

FIG. 9 is a rear elevational view of the front cover plate of the assembly as seen along line 9—9 of FIG. 8.

DETAILED DESCRIPTION OF THE INVENTION

Figure 1:
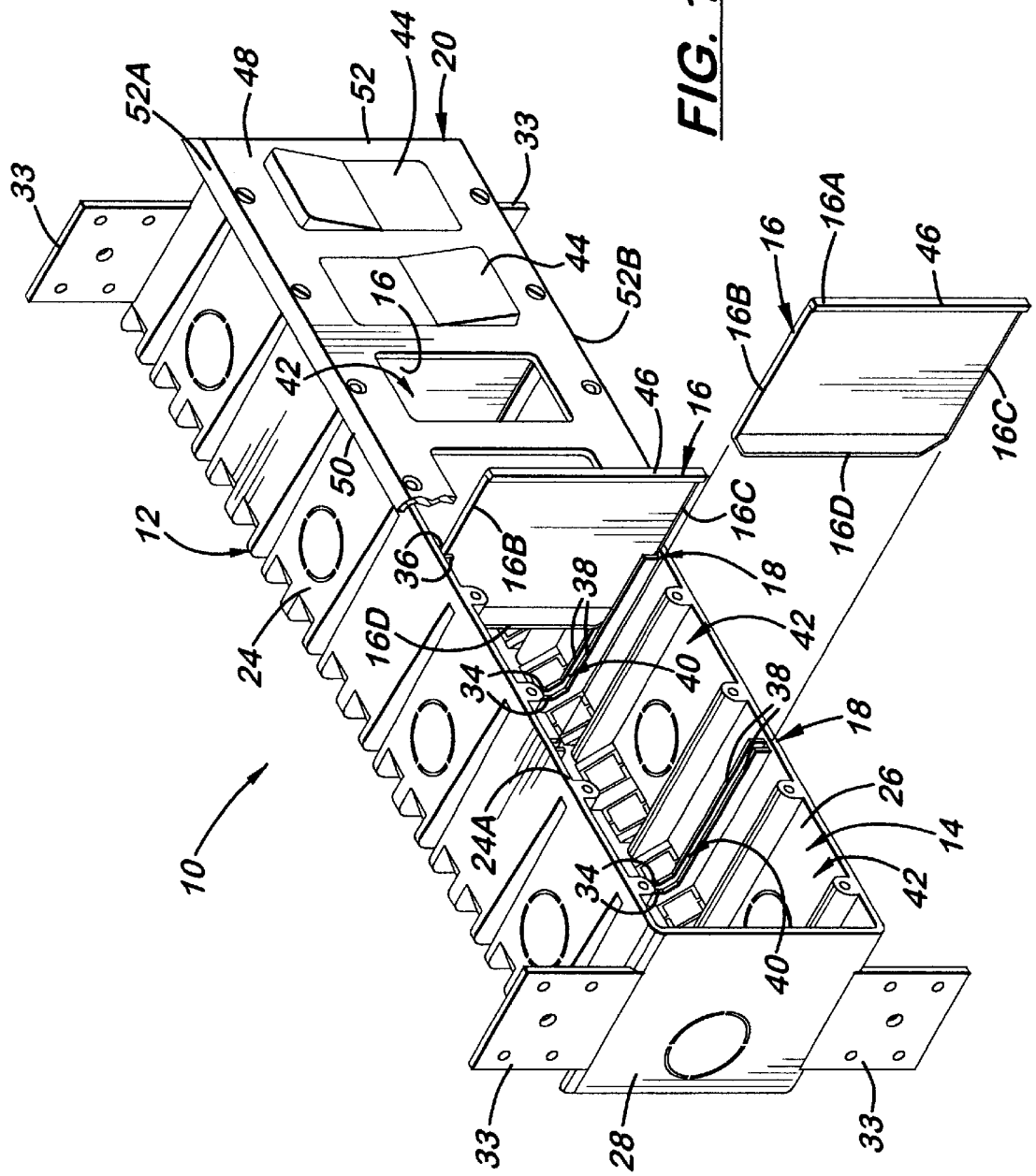
FIG. 1 is a front perspective view of a multi-gang box assembly of the present invention showing a portion of a front cover plate broken away to expose an interior chamber of a main box and showing two of a plurality of divider panels for providing partitions between side-by-side compartments in the interior chamber of the main box being respectively partially and fully slidably removed from the main box.
Figure 3A:
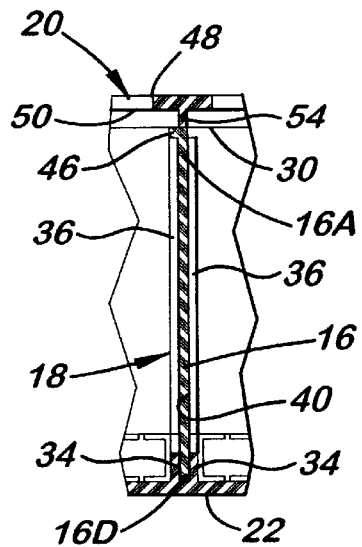
FIG. 3A is an enlarged fragmentary detailed view of the portion of the assembly of FIG. 3 enclosed by oval 3A.
Figure 4:
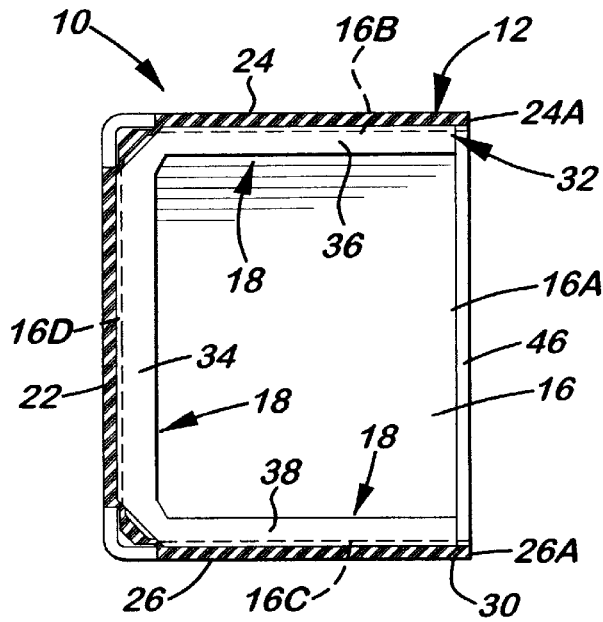
FIG. 4 is an enlarged cross-sectional view of the assembly taken along line 4—4 of FIG. 3 showing one of the divider panels installed in the interior chamber of the main box.
Figure 5:
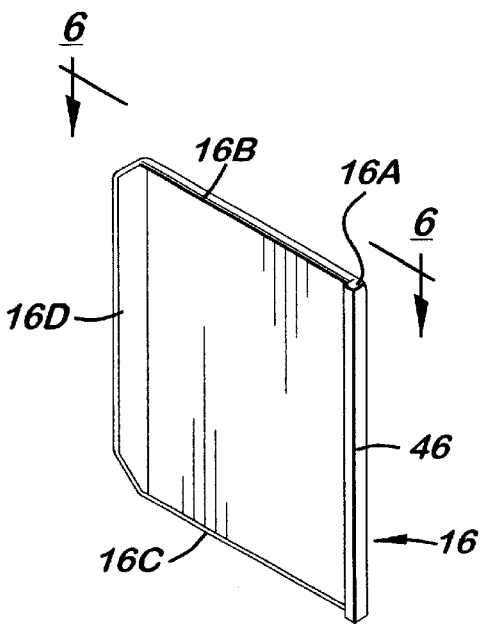
FIG. 5 is an enlarged perspective view of the one removed divider panel of FIG. 1.
Figure 6:
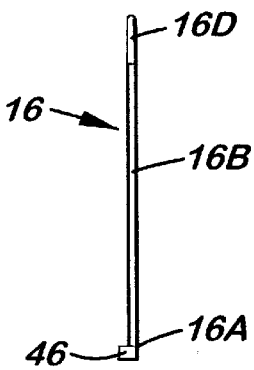
FIG. 6 is a top plan view of the divider panel as seen along line 6—6 of FIG. 5.

Referring to the drawings and particularly to FIGS. 1 to 3, there is illustrated a multiple gang junction box assembly of the present invention, generally designated 10. The assembly 10 basically includes a main box 12 having an interior chamber 14, a plurality of partitions or divider panels 16 separable from the main box 12, a plurality of positioning elements 18 attached to the main box 12 in the interior chamber 14 for slidably receiving and positioning the divider panels 16 in the interior chamber 14, and a front cover plate 20 separable from the main box 12 and divider panels 14. As an example, the main box 12, divider panels 16, positioning elements 18 and front cover plate 20 can be made of a suitable conventional plastic material and manufactured by conventional injection molding techniques. While the main box 12 can have any desired size, one example is a length of fourteen and one-half inches so that the main box 12 can be fitted between two sixteen-inch on-center studs (not shown).

More particularly, the main box 12 of the assembly 10 including a rear wall 22, a top wall 24, a bottom wall 26 and a pair of opposite side walls 28. The rear, top, bottom and side walls 22, 24, 26, 28 are integrally interconnected so as to form the interior chamber 14 of the box 12 and provide the box 12 with a generally rectangular configuration. The top, bottom and opposite side walls 24, 26, 28 have respective forward edge portions 24A, 26A, 28A which together form a front peripheral edge 30 of the main box 12 defining a front opening 32 to the interior chamber 14. Tabs 33 integrally attached to and extending above and below side walls 28 can be employed to secure the main box 12 to the studs.

The plurality of positioning elements 18 preferably are in the form of a plurality of laterally spaced apart sets of pairs of spaced apart rear, top and bottom ledges 34, 36, 38 integrally attached on and extending along the interiors of the rear, top and bottom walls 22, 24, 26 of the main box 12 between the rear wall 22 and the front peripheral edge 30 thereof. The pairs of spaced apart rear, top and bottom ledges 34, 36, 38 are attached one pair to the next and extend into the interior chamber 16. Also, the pairs of spaced apart rear, top and bottom ledges 34, 36, 38 of each set are aligned with one another and together define a C-shaped channel 40 therebetween located in the interior chamber 16 which slidably receives and positions one of the divider panels 18 in the interior chamber 16 so as to laterally space apart the divider panels 16 from one another through a given displacement "a". The divider panels 16 and ledges 34, 36, 38 solidly partition the interior chamber 14 into a plurality of side-by-side compartments 42 provided in a condition of electrical arcing isolation from one another. The isolated compartments 42 allow low electrical voltage components, such as light switches and volume controls 44, and high electrical voltage (110 VAC) components (not shown) to be housed in the adjacent compartments 42.

Each of the divider panels 16 of the assembly 10 has a front edge portion 16A thereon. Each of the divider panels 16 further has a top edge portion 16B, a bottom edge portion 16C and a rear edge portion 16D which preferably are thinner than the remainder of the divider panel 16 to facilitate insertion of the divider panel 16 into the channel 40. The front edge portion 16A of each divider panel 16 preferably has a front flange 46 formed thereon which extends transversely in relation to the remainder of the divider panel 16 and has a width greater than the thickness of the divider panel 16. The front flange 46 of each divider panel 16 extends in one direction, and transversely, in relation to the remainder of the divider panel 16 and has a width greater than the thickness of the divider panel 16.

The front cover plate 16 of the assembly 10 has opposite front and rear sides 48, 50, a peripheral edge 52 and a plurality of vertical lands 54 formed on and protruding from the rear side 50 of the front cover plate 16. The vertical lands 54 are laterally spaced apart from one another by a given distance "b". The given displacement "a" of the divider panels 14 from one another in the interior chamber 14 is substantially equal to a predetermined number of times the given distance "b" of the vertical lands 54 from one another. The given displacement "a" of the divider panels 14 from one another is preferably substantially equal to two times the given distance "b" of the vertical lands 54 from one another. The vertical lands 54 also extend between and interconnect top and bottom portions 52A, 52B of the peripheral edge 52 of the front cover plate 16. When the front cover plate 16 is positioned adjacent to the front peripheral edge 30 of the main box 12 and attached to the main box 12 using any suitable known technique so as to cover the front opening 32 thereof, flat surfaces 54A of some of the vertical lands 54 of the front cover plate 16, such as every other land 54, and flat surfaces 46A of the front flanges 46 of the divider panels 16 are placed in flush contact with one another. Such flush contact between the flat surfaces 54A, 46A closes off adjacent ones of the side-by-side compartments 42 from one another at the front flanges 46 of the divider panels 14 and thereby provides additional electrical arcing isolation of the side-by-side compartments 42 from one another. The width of the front flange 46 of each of the divider panels 16 also is greater than the width of the one of the vertical lands 54 of the front cover plate 20 such that the land 54 can be somewhat misaligned with the divider panel 16 in the lengthwise direction of the main box 12 and still be in flush contact with the front flange 46 on the respective divider panel 16. This width difference between the front flanges 46 and lands 54 accommodates component tolerance and mounting variations.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A multiple gang junction box assembly, comprising:
   (a) a main box having an interior chamber and a front peripheral edge defining a front opening to said interior chamber;
   (b) a plurality of divider panels separable from said main box, each of said divider panels having a front edge portion thereon;
   (c) a plurality of positioning elements attached to said main box in said interior chamber thereof slidably receiving and positioning said divider panels in said interior chamber so as to laterally space apart said divider panels from one another through a given displacement and to partition said interior chamber into a plurality of side-by-side compartments provided in a condition of electrical arcing isolation from one another which allows low and high electrical voltage components to be housed in said side-by-side compartments; and (d) a front cover plate separable from said main box and said divider panels, said front cover plate having opposite front and rear sides, a peripheral edge and a plurality of vertical lands formed on and protruding from said rear side of said front cover plate and laterally spaced apart from one another by a given distance, said given displacement of said divider panels from one another in said interior chamber being substantially equal to a predetermined number of times said given distance of said vertical lands from one another, said vertical lands also extending between top and bottom portions of said peripheral edge of said front cover plate such that with said front cover plate positioned adjacent to said front peripheral edge of said main box and covering said front opening thereof at least some of said vertical lands of said front cover plate and said front edge portions of said divider panels are placed in flush contact with one another so as to close off adjacent ones of said side-by-side compartments from one another at said front edge portions of said divider panels and thereby provide additional isolation of said side-by-side compartments from one another.

2. The assembly of claim 1 wherein said main box, divider panels and front cover plate are made of plastic material.

3. The assembly of claim 1 wherein said given displacement of said divider panels from one another in said interior chamber of said main box is substantially equal to two times said given distance of said vertical lands from one another.

4. The assembly of claim 1 wherein said main box includes rear, top, bottom, and opposite side walls being interconnected so as to form said interior chamber.

5. The assembly of claim 4 wherein said top, bottom and opposite side walls have respective forward edge portions defining said front peripheral edge of said main box.

6. The assembly of claim 4 wherein said positioning elements are a plurality of laterally spaced apart sets of pairs of spaced apart ledges attached on and extending along interiors of said top, bottom and rear walls and extending into said interior chamber, said pairs of spaced apart ledges of each set being aligned with one another and defining a channel therebetween.

7. The assembly of claim 6 wherein each of said divider panels is insertable into said channel defined by said pairs of spaced apart ledges of one of said spaced apart sets thereof.

8. The assembly of claim 7 wherein each of said divider panels has top, bottom and rear edge portions thinner than the remainder of said divider panel to facilitate insertion of said divider panel into said channel.

9. The assembly of claim 1 wherein said front edge portion of each of said divider panels is a front flange having a width greater than a width of said one of said vertical lands of said front cover plate such that said land can be misaligned with said divider panel and still be in flush contact with said front flange on said divider panel.

10. The assembly of claim 9 wherein said front flange of each of said divider panels extends transversely in relation to the remainder of said divider panel and has a width greater than a thickness of said divider panel.

11. A multiple gang junction box assembly, comprising:

(a) a main box including rear, top, bottom, and opposite side walls being interconnected so as to form an interior chamber of said main box, said top, bottom and opposite side walls having respective forward edge portions forming a front peripheral edge defining a front opening to said interior chamber;

(b) a plurality of divider panels separable from said main box, each of said divider panels having a front edge portion thereon;

(c) a plurality of laterally spaced apart sets of pairs of spaced apart ledges attached on and extending along interiors of said top, bottom and rear walls of said main box between said rear wall and front peripheral edge thereof and extending into said interior chamber, said pairs of spaced apart ledges of each set being aligned with one another and defining a channel therebetween in said interior chamber slidably receiving and positioning said divider panels in said interior chamber so as to laterally space apart said divider panels from one another through a given displacement and to partition said interior chamber into a plurality of side-by-side compartments provided in a condition of electrical arcing isolation from one another which allows low and high electrical voltage components to be housed in said side-by-side compartments; and (d) a front cover plate separable from said main box and said divider panels and adapted to be positioned adjacent to said front peripheral edge of said main box and to cover said front opening thereof.

12. The assembly of claim 11 wherein said main box, divider panels, positioning elements and front cover plate are made of plastic material.

13. The assembly of claim 11 wherein each of said divider panels has top, bottom and rear edge portions thinner than the remainder of said divider panel to facilitate insertion of said divider panel into said channel.

14. The assembly of claim 11 wherein said front cover plate has opposite front and rear sides, a peripheral edge and a plurality of vertical lands formed on and protruding from said rear side of said front cover plate and laterally spaced apart from one another by a given distance, said given displacement of said divider panels from one another in said interior chamber being substantially equal to a predetermined number of times said given distance of said vertical lands from one another, said vertical lands also extending between top and bottom portions of said peripheral edge of said front cover plate such that with said front cover plate positioned adjacent to said front peripheral edge of said main box and covering said front opening thereof at least some of said vertical lands of said front cover plate and said front edge portions of said divider panels are placed in flush contact with one another so as to close off adjacent ones of said side-by-side compartments from one another at said front edge portions of said divider panels and thereby provide additional isolation of said side-by-side compartments from one another.

15. The assembly of claim 14 wherein said given displacement of said divider panels from one another in said interior chamber of said main box is substantially equal to two times said given distance of said vertical lands from one another.

16. The assembly of claim 14 wherein said front edge portion of each of said divider panels is a front flange having a width greater than a width of said one of said vertical lands of said front cover plate such that said land can be misaligned with said divider panel and still be in flush contact with said front flange on said divider panel.

17. The assembly of claim 16 wherein said front flange of each of said divider panels extends transversely in relation to the remainder of said divider panel and has a width greater than a thickness of said divider panel.

18. A multiple gang junction box assembly, comprising:
(a) a main box including rear, top, bottom, and opposite side walls being interconnected so as to form an interior chamber of said main box, said top, bottom and opposite side walls having respective forward edge portions forming a front peripheral edge defining a front opening to said interior chamber;
(b) a plurality of divider panels separable from said main box, each of said divider panels having a front edge portion thereon;
(c) a plurality of laterally spaced apart sets of pairs of spaced apart top, bottom and rear ledges attached on and extending along interiors of said top, bottom and rear walls of said main box between said rear wall and front peripheral edge thereof and extending into said interior chamber, said pairs of spaced apart top, bottom and rear ledges of each set being aligned with one another and together defining a C-shaped channel therebetween slidably receiving and positioning said divider panels in said interior chamber so as to laterally space apart said divider panels from one another through a given displacement and to partition said interior chamber into a plurality of side-by-side compartments provided in a condition of electrical arcing isolation from one another which allows low and high electrical voltage components to be housed in said side-by-side compartments; and
(d) a front cover plate separable from said main box and said divider panels, said front cover plate having opposite front and rear sides, a peripheral edge and a plurality of vertical lands formed on and protruding from said rear side of said front cover plate and laterally spaced apart from one another by a given distance, said given displacement of said divider panels from one another in said interior chamber being substantially equal to a predetermined number of times said given distance of said vertical lands from one another, said vertical lands also extending between top and bottom portions of said peripheral edge of said front cover plate such that with said front cover plate positioned adjacent to said front peripheral edge of said main box and covering said front opening thereof at least some of said vertical lands of said front cover plate and said front edge portions of said divider panels are placed in flush contact with one another so as to close off adjacent ones of said side-by-side compartments from one another at said front edge portions of said divider panels and thereby provide additional isolation of said side-by-side compartments from one another, said front edge of each of said divider panels being in the form of a front flange having a width greater than a width of said one of said vertical lands of said front cover plate such that said land can be misaligned with said divider panel and still be in flush contact with said front flange on said divider panel, said front flange extends transversely in relation to the remainder of said divider panel and has a width greater than a thickness of said divider panel.

19. The assembly of claim 18 wherein said main box, divider panels, positioning elements and front cover plate are made of plastic material.

* * * * *